UNITED STATES PATENT OFFICE.

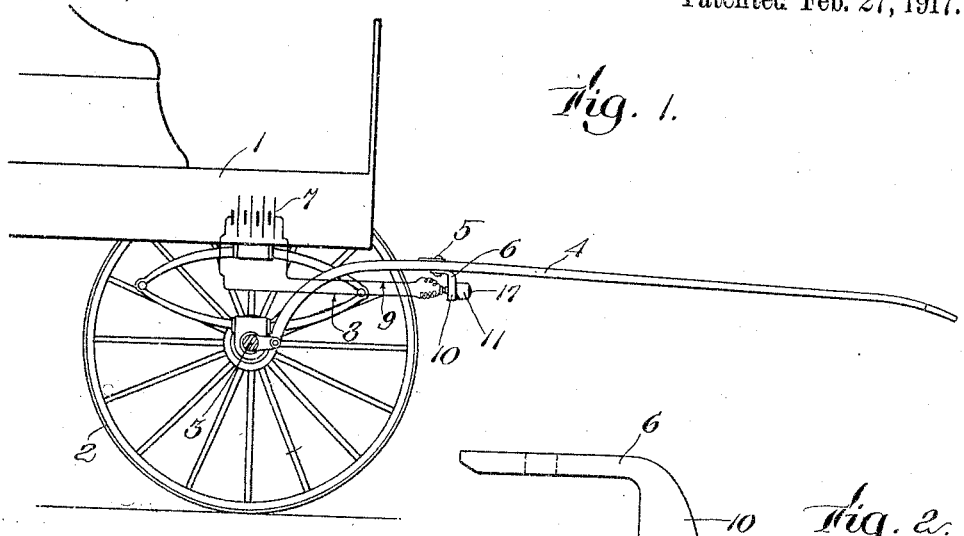

ELIAS W. SCHURMAN, OF CENTRAL BEDEQUE, PRINCE EDWARD ISLAND, CANADA, ASSIGNOR OF ONE-HALF TO ALFORD M. GRAHAM, OF BOSTON, MASSACHUSETTS.

VEHICLE-LIGHT.

1,217,644.   Specification of Letters Patent.   Patented Feb. 27, 1917.

Application filed August 28, 1914. Serial No. 859,136.

*To all whom it may concern:*

Be it known that I, ELIAS W. SCHURMAN, a resident of Central Bedeque, in Prince county, province of Prince Edward Island, Canada, (whose post-office address is Bedeque, Prince Edward Island, Canada,) have invented an Improvement in Vehicle-Lights, of which the following description, in connection with the accompanying drawings, is a specification, like letters on the drawings representing like parts.

My present invention is an improved electric light, intended primarily for horse-drawn vehicles, and especially adapted to be affixed to the shafts of a wagon or buggy, not only to furnish the vehicle with a light, but also to illuminate the roadway in front of the horse's feet, and at the same time to be shielded from the driver's vision. I prefer to utilize a relatively small electric light, which may be supplied by any suitable battery on the vehicle itself, and which light will be greatly magnified by a suitable parabolic reflector and a lens. By employing a light which will consume but a small amount of current, I can provide a very inexpensive and serviceable vehicle light, thus overcoming the many objections to equipping a horse-drawn vehicle with an electric search light, and enabling a practicable, commercial article to be produced. This invention is of special importance at the present time, when the road laws of many States require that all vehicles be provided with lights as a safety measure.

In the manufacture of a vehicle lamp in accordance with my present invention, where economy is an important feature, I use a small incandescent lamp and a reflector, and provide any adjustable connection therewith, so that the lamp may be positioned in just the right foci of the reflector and also held in this position through spring tension. Preferably these springs constitute the means for supplying the electric current to the lamp, and will always maintain their contact despite the jolts, jars and vibrations incident to actual use.

Other details of invention, novel combinations of parts, and features of construction will be hereinafter more fully pointed out and claimed.

Referring to the drawings, illustrating a preferred embodiment of my invention,

Figure 1 is a fragmentary view of a vehicle with a light in position on one of the shafts, and a connection therewith, shown in diagrammatic form to the source of power.

Fig. 2 is an enlarged side view of the lamp and bracket;

Fig. 3 being a cross sectional view on the line 3—3 of Fig. 2;

Fig. 4 is a front view of the lamp and bracket; and

Fig. 5 is a view of the lamp socket holder.

In Fig. 1 I have illustrated a fragmentary section of a wagon body 1 and a fore wheel 2 and axle 3 in conventional form, to which is secured the pole for a team, or the shafts for a single horse, one of such shafts being indicated as 4. To the underside of a shaft 4 is secured by a bolt 5 a clamping bracket 6, which carries the light. Any suitable source of power, as a primary or storage battery, is fitted in the vehicle as indicated at 7, and wires 8 and 9 are led therefrom in any convenient way (illustrated diagrammatically in Fig. 1) to the light.

As illustrated in Figs. 2 and 4, the bracket 6 has a depending portion 10 adapted to encircle the casing 11 of the vehicle light, being clamped thereto by a bolt 12 and nut 13, as shown. The bolt 5 may conveniently be one of the regular bolts uniting the braces on the shaft 4 with a cross-piece, or may be a separate bolt, and it will be understood that a similar light may be carried under each side of a pair of shafts, if deemed desirable. With the light in this position, it is shielded by the shaft 4 from the vision of the driver in the buggy as well as from the animal drawing the vehicle, and yet is in proper position, as to height, location and use to illuminate the roadway immediately in advance of the vehicle.

My vehicle light itself comprises the casing 11, a backing 14 carrying terminal posts 15 and 16 for the wires 8 and 9 respectively, the lens 17 and reflector 18. The rear portion of the reflector 18 is formed as a threaded neck 19 to receive the correspondingly threaded socket 20 of the incandescent lamp 21. The casing 11 is secured to the backing 14, the latter preferably of fiber or other insulating material, in any suitable manner, and the forward portion 30 is convexed slightly to inclose the marginal rim of the lens 17 (see Fig. 3.) To retain the lens 17 and the reflector 18 in position, I provide a plurality of rings, 22, 23 and 24, which will hold the lens 17 and reflector 18 in assembled position. Preferably rings 22 and 23 are of fiber or leather, so as to prevent any noise or rattle in the device, while 24 is a metallic spring to hold the parts in proper position. The binding posts 15 and 16 extend through the backing 14, and have secured on the inner ends spring brushes 25 and 26, one adapted to contact with the neck 19 of the reflector, and the other contacts directly with the lead to the light 21. The threaded connection between the neck 19 and the socket 20 of the lamp enables the lamp to be positioned inwardly or outwardly relatively with the reflecting surface 27 of the reflector, so as to secure the best effect and conserve all the illumination from the relatively small lamp, throwing the rays directly through the lens 17, similar to the reflector and lens on an automobile search light.

It will be seen that I have produced an efficient and powerful small electric light, suitable for vehicles, which can be manufactured at slight expense and affixed quickly directly to any horse-drawn vehicle.

The construction of the electric search light itself with the lamp socket held centrally of the reflector and in adjustable position, together with the rings to prevent vibration and noise between the reflector and the lens, are applicable to any electric search light, and therefore I wish to claim these features broadly. The further feature of having the reflector, the lamp, the lens 17, and the washer 22, all held in yieldingly assembled position, to prevent noise, rattle, etc. is also of importance in any searchlight subject to constant jars and jolts and such yielding means consisting preferably of the electrical contacts supplying current to the lamp, thus greatly simplifying the construction, is of very decided importance in a light of this type.

Having described my invention, what I claim as new and desire to secure by Letters Patent is:

1. In combination, an electric light on the shaft of a horse-drawn vehicle, said light being arranged to be secured under and shadowed by a shaft of the vehicle, means to attach the light under said shaft, said attaching means coöperating with the light and shaft to enable the light to illuminate the roadway for both horse and driver, while said shaft shields the vision of both from the glare of the light, said light comprising a relatively small electric searchlight having an inclosing casing, a lens, and a reflector held by yielding means in said casing, the attaching means uniting the lamp and vehicle shaft consisting in a bracket clamp, detachably secured to the shaft.

2. In combination, an electric light having an inclosing casing with its forward portion flanged inwardly, a lens adapted to be held in said casing against the flange, a reflector also held within said casing by yielding means and adapted to retain the lens in contact with the inturned flange of the casing, yielding means between the lens and reflector to prevent noise and rattling, a relatively small electric light within the reflector and means to supply current thereto, together with a vehicle shaft carrying said light, in position under the shaft to constitute said shaft as a shield of the light from the driver.

In testimony whereof, I have signed my name to this specification, in the presence of two subscribing witnesses.

ELIAS W. SCHURMAN.

Witnesses:
 HEATH STRONG,
 HENRY P. STRONG.